(12) United States Patent
Doughan et al.

(10) Patent No.: US 9,529,576 B2
(45) Date of Patent: Dec. 27, 2016

(54) SYSTEMS AND METHODS FOR OBJECT TO XML MAPPINGS

(75) Inventors: Blaise Doughan, Nepean (CA); Douglas Clarke, Ottawa (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 650 days.

(21) Appl. No.: 13/332,166

(22) Filed: Dec. 20, 2011

(65) Prior Publication Data

US 2013/0086134 A1 Apr. 4, 2013

Related U.S. Application Data

(60) Provisional application No. 61/542,021, filed on Sep. 30, 2011.

(51) Int. Cl.
G06F 9/445 (2006.01)

(52) U.S. Cl.
CPC . *G06F 8/60* (2013.01); *G06F 8/61* (2013.01); *G06F 9/4451* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 5,937,409 A | 8/1999 | Wetherbee | |
| 6,134,559 A | 10/2000 | Brumme et al. | |
| 6,633,889 B2 | 10/2003 | Dessloch et al. | |
| 7,526,490 B2 * | 4/2009 | Doughan | |
| 7,565,376 B2 | 7/2009 | Stegmann et al. | |
| 7,653,651 B1 | 1/2010 | Pavlov | |
| 7,694,293 B2 * | 4/2010 | Rao | 717/172 |
| 7,702,649 B1 | 4/2010 | Bresch | |
| 7,739,223 B2 * | 6/2010 | Vaschillo et al. | |
| 8,032,560 B2 | 10/2011 | Heider | |
| 8,260,643 B2 * | 9/2012 | Benayon et al. | 705/7.11 |

(Continued)

OTHER PUBLICATIONS

Wikipedia, "Hash Table," Mar. 9, 2011, downloaded from the Wayback Machine Internet Archive <url>: http://web.archive.org/web/20110309071409/http://en.wikipedia.org/wiki/Hash_table, pp. 1-12.*

(Continued)

*Primary Examiner* — Thuy Dao
*Assistant Examiner* — Stephen Berman
(74) *Attorney, Agent, or Firm* — Tucker Ellis LLP

(57) ABSTRACT

Systems and methods are provided for automatically provisioning resources based on application characteristics. In accordance with an embodiment, a system can include a computer, including a computer readable medium and processor. The system can further include one or more servers executing on the computer and an extensible application deployed to the one or more servers, wherein the application includes a plurality of real properties. A plurality of tenants can each utilize the application at the one or more servers. The extensible application is configured to be customized for each tenant, wherein customizing includes for each tenant, defining one or more virtual properties for the application in a metadata file, and mapping the one or more virtual properties to the application using the metadata file.

16 Claims, 9 Drawing Sheets

(56) References Cited

U.S. PATENT DOCUMENTS

| | | | |
|---|---|---|---|
| 8,261,295 B1* | 9/2012 | Risbood | G06F 8/61 |
| | | | 717/177 |
| 8,266,576 B2* | 9/2012 | Lam et al. | 717/100 |
| 8,671,404 B2* | 3/2014 | DeHaan et al. | 718/1 |
| 8,706,800 B1* | 4/2014 | Ahmed et al. | 709/203 |
| 9,274,811 B1* | 3/2016 | Reeves | G06F 8/61 |
| 2003/0046266 A1 | 3/2003 | Mullins et al. | |
| 2003/0110279 A1 | 6/2003 | Banerjee et al. | |
| 2003/0163809 A1* | 8/2003 | Bantz | G06F 8/60 |
| | | | 717/177 |
| 2005/0234931 A1 | 10/2005 | Yip et al. | |
| 2005/0262475 A1* | 11/2005 | Halpern | 717/114 |
| 2005/0262499 A1* | 11/2005 | Read | 717/172 |
| 2006/0026168 A1* | 2/2006 | Bosworth | G06F 8/60 |
| 2007/0198564 A1* | 8/2007 | Blackstone et al. | 707/101 |
| 2007/0271210 A1 | 11/2007 | Heider et al. | |
| 2007/0288892 A1* | 12/2007 | Foti | 717/114 |
| 2008/0034364 A1* | 2/2008 | Lam et al. | 718/1 |
| 2008/0127162 A1* | 5/2008 | Xu | G06F 9/44505 |
| | | | 717/168 |
| 2008/0162483 A1 | 7/2008 | Becker | |
| 2008/0320441 A1 | 12/2008 | Ahadian et al. | |
| 2008/0320467 A1* | 12/2008 | Bojjireddy | G06F 8/60 |
| | | | 717/174 |
| 2009/0063213 A1* | 3/2009 | Benayon et al. | 705/7 |
| 2009/0112908 A1 | 4/2009 | Wintel et al. | |
| 2009/0204961 A1* | 8/2009 | DeHaan et al. | 718/1 |
| 2009/0276784 A1* | 11/2009 | Grieve | G06F 9/44505 |
| | | | 718/104 |
| 2010/0122239 A1 | 5/2010 | Neufeld et al. | |
| 2010/0161648 A1 | 6/2010 | Eberlein et al. | |
| 2010/0287208 A1 | 11/2010 | Mao et al. | |
| 2011/0083069 A1* | 4/2011 | Paul | G06F 8/60 |
| | | | 715/234 |
| 2011/0145194 A1 | 6/2011 | Figus et al. | |
| 2011/0153576 A1 | 6/2011 | Figus | |
| 2011/0154253 A1 | 6/2011 | Lehr et al. | |
| 2011/0321010 A1 | 12/2011 | Wang | |
| 2012/0023067 A1 | 1/2012 | Clegg et al. | |
| 2012/0166389 A1 | 6/2012 | Shiozawa | |
| 2012/0284234 A1 | 11/2012 | Mashtizadeh et al. | |
| 2012/0324419 A1* | 12/2012 | Roberts et al. | 717/102 |
| 2013/0117346 A1 | 5/2013 | Figus | |
| 2013/0219060 A1* | 8/2013 | Sturgeon et al. | 709/224 |

OTHER PUBLICATIONS

Wikipedia, "XML," Mar. 4, 2011, downloaded from the Wayback Machine Internet Archive <url>: http://web.archive.org/web/20110304182527/http://en.wikipedia.org/wiki/XML, pp. 1-13.*

Wikipedia, "XML data binding," May 31, 2010, downloaded from the Wayback Machine Internet Archive <url>: http://web.archive.org/web/20100531060546/http://en.wikipedia.org/wiki/XML_data_binding, pp. 1-2.*

Mietzner et al., "Variability modeling to support customization and deployment of multi-tenant-aware Software as a Service applications," 2009, PESOS '09 Proceedings of the 2009 ICSE Workshop on Principles of Engineering Service Oriented Systems, pp. 18-25.*

Guo et al., "A Framework for Native Multi-Tenancy Application Development and Management," 2007, The 9th IEEE International Conference on E-Commerce Technology and the 4th IEEE International Conference on Enterprise Computing, E-Commerce and E-Services (CEC-EEE 2007), pp. 551-558.*

Kwok et al., "A Software as a Service with Multi-tenancy Support for an Electronic Contract Management Application," 2008, IEEE International Conference on Services Computing SCC '08, vol. 2, pp. 179-186.*

King et al., "Hibernate Reference Documentation 3.3.2.GA" published Jun. 24, 2009. Available at <http://docs.jboss.org/hibernate/orm/3.3/reference/en-US/html/> . 342 pages.

Soffiato et al., "Using Existing Hibernate Data Models and Multi-Tenant plugin", published Sep. 20, 2010, 1 page.

Rekadze et al. "Oracle Fusion Middleware Developer's Guide for Oracle TopLink, 11g Release 1(11.1.1)" published Sep. 2008, 1470 pages.

United States Patent and Trademark Office, Office Actioin Dated May 4, 2016 for U.S. Appl. No. 13/332,126, 14 Pages.

* cited by examiner

```
@XmlRootElement
@XmlVirtualAccessMethods
@XmlAccessorType(AccessType.PROPERTY)
public class Customer { private int id;

private String name;

private Map<String, Object> extensions = new
    HashMap<String, Object>();

public Object get(String name) {
        return extensions.get(name);
    } public void set(String name, Object value) {
        extensions.put(name, value);
    }

@XmlAttribute
    public int getId() {
        ...
    }
}
```
301

302
304
306
308
310

```xml
<java-types>
    <java-type name="Customer">
        <xml-virtual-access-methods />
        <java-attributes>
            <xml-attribute java-attribute="id"
                type="java.lang.Integer" />
            <xml-element java-attribute="name"
                type="java.lang.String" />
        </java-attributes>
    </java-type>
</java-types>
```
312
314

```xml
<java-types>
    <java-type name="Customer">
        <java-attributes>
            <xml-element java-attribute="discountCode"
                name="discount-code"
                type="java.lang.String" />
        </java-attributes>
    </java-type>
</java-types>
```
316
318

```
<?xml version="1.0" encoding="UTF-8"?>
<customer>
   <firstName>Jane</firstName>
   <middleName>Anne</middleName>
   <lastName>Doe</lastName>
   <billingAddress>
      <street>1 Billing Street</street>
   </billingAddress>
   <shippingAddress>
      <street>2 Shipping Road</street>
   </shippingAddress>
   <phoneNumber type="WORK">555-WORK</phoneNumber>
   <phoneNumber type="HOME">555-HOME</phoneNumber>
</customer>
```

804
808
801

```
<?xml version="1.0" encoding="UTF-8"?>
<customer xmlns="urn:tenant1" firstName="Jane" lastName="Doe">
   <address>
      <street>1 Billing Street</street>
   </address>
   <phoneNumber>555-WORK</phoneNumber>
</customer>
```

SYSTEMS AND METHODS FOR OBJECT TO XML MAPPINGS

CLAIM OF PRIORITY

This application claims benefit to the following U.S. Provisional Patent Application: U.S. Provisional Patent Application No. 61/542,021 entitled "SYSTEMS AND METHODS FOR OBJECT TO XML MAPPINGS," by Blaise Doughan et al., filed Sep. 30, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to an application server environment and to the extensibility of software applications in the application server environment, and is particularly related to systems and methods for object to XML mappings.

BACKGROUND

EclipseLink is an object-persistence and object-transformation framework that provides development tools and run-time capabilities which can reduce development and maintenance efforts, and increase enterprise application functionality. An implementation of the Java Persistence API (JPA) framework is provided by EclipseLink, which enables java classes and objects to be stored in data sources, allowing information to be used across sessions. EclipseLink also provides an implementation of the Java Architecture for XML Binding (JAXB) framework, which enables java classes and objects to be transformed to/from Extensible Markup Language (XML) nodes. Using EclipseLink, software applications can be built which store persistent object-oriented data in a relational database; and can be used to transform object-oriented data into either relational data or Extensible Markup Language (XML) elements.

Applications developed using EclipseLink can be configured to support multitenancy. In multitenant applications, multiple different users (i.e. tenants) can utilize the application. These different users may represent varied businesses with particular needs. A software application may be developed generically, with several default properties or attributes which are broadly applicable to many users. However, these default properties may be insufficient to adequately capture all of the data relevant to a particular user.

SUMMARY

Generally, in current systems Java fields and properties can be mapped to XML, where the user must have an existing Java field or property to map. Applications are generally provided with a set of properties which are likely to be useful to the largest number of potential application users. However, different application users often have very different requirements and an additional degree of customization can allow the application users to tailor a generic application to better suit their needs. In a multi-tenant architecture, a single application runs on a server, serving multiple client organizations (i.e., tenants or application users). Multi-tenant applications can allow per-tenant customizations. When these customizations are made to data, it can be difficult for the binding layer to handle them. Typical XML binders, such as JAXB, are designed to work with domain models that have real fields and properties. Virtual properties can be defined by a metadata file, and can provide a way to extend a class without modifying the source.

BRIEF DESCRIPTION OF THE FIGURES

FIG. 3 shows an example of providing virtual properties using an annotation, in accordance with an embodiment.

FIG. 6 shows exemplary XML mapping files, in accordance with an embodiment.

FIG. 7 shows exemplary accessor methods, in accordance with an embodiment.

FIG. 8 shows exemplary output files, in accordance with an embodiment.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Generally, in current systems Java fields and properties can be mapped to XML, where the user must have an existing Java field or property to map. Applications are generally provided with a set of properties which are likely to be useful to the largest number of potential application users. However, different application users often have very different requirements and an additional degree of customization can allow the application users to tailor a generic application to better suit their needs. In a multi-tenant architecture, a single application runs on a server, serving multiple client organizations (i.e., tenants or application users). Multi-tenant applications can allow per-tenant customizations. When these customizations are made to data, it can be difficult for the binding layer to handle them. Typical XML binders, such as JAXB, are designed to work with domain models that have real fields and properties. Virtual properties can be defined by a metadata file, and can provide a way to extend a class without modifying the source.

In accordance with an embodiment, to support multi-tenancy, i.e., where an application is used to serve multiple, different application users (tenants), an application user can add additional mappings at runtime using virtual properties. The virtual properties enable an application user to customize, i.e., extend, an application by allowing them to add custom attributes specific to that application user. Accessor methods (i.e., get( ) and set( ) methods) specific to the virtual properties can be used to maintain extension data.

Figure 1:
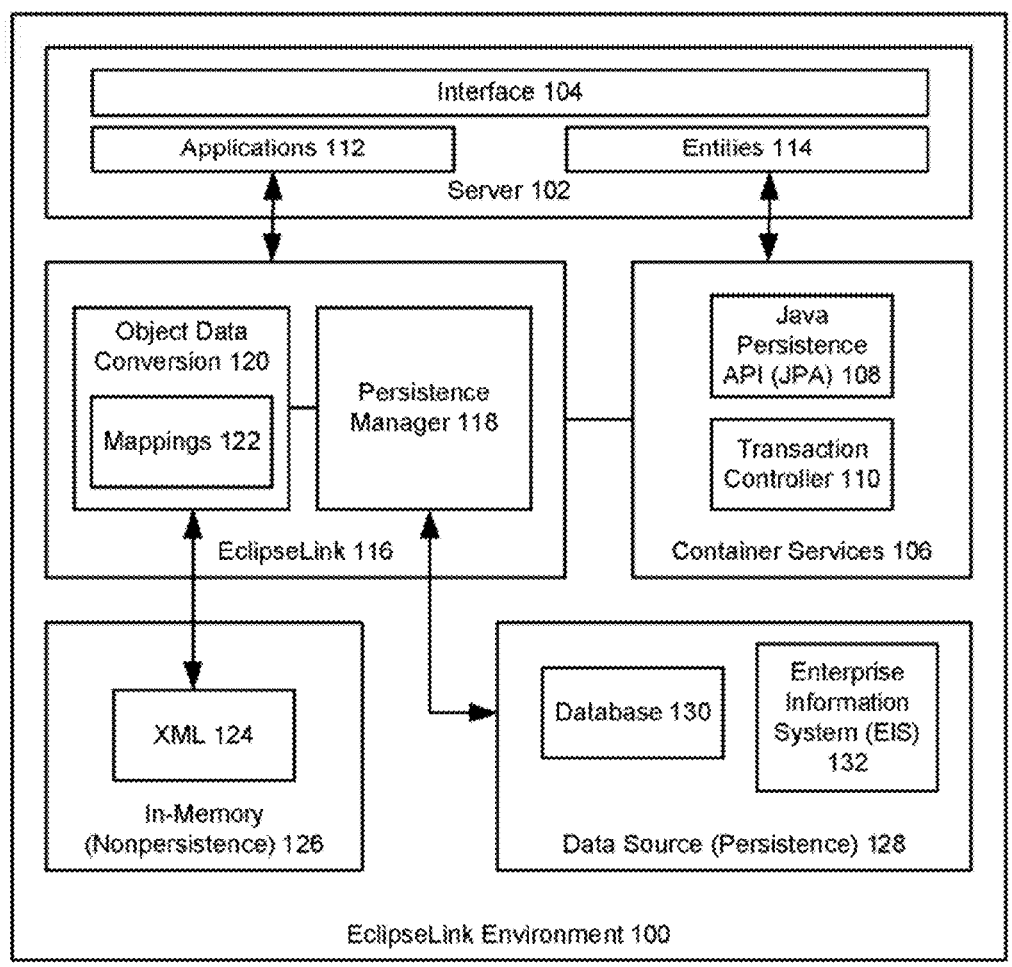
FIG. 1 shows an illustration of an EclipseLink environment, in accordance with an embodiment.

FIG. 1 shows an illustration of an EclipseLink environment, in accordance with an embodiment. As noted above, persistent applications can be developed using EclipseLink. As shown in FIG. 1, the EclipseLink environment 100 can include a server 102, which includes an interface 104 through which the EclipseLink environment can be accessed, and a plurality of container services 106 such as an implementation of the Java Persistence API (JPA) 108 and a transaction controller 110. The implementation of the Java Persistence API (JPA) framework, provided by EclipseLink, enables applications 112 to define objects that are to be made persistent. In JPA, these application-defined objects are called entities 114. Entities have persistent identities (i.e., instances can be uniquely identified and distinguished from one another); and are transactional (i.e., an entity is created, updated and deleted within a transaction, and a transaction is required for the changes to be committed in the database). However, in-memory entities can be changed without the changes being persisted. Additionally, an entity is a fine-grained object that has a set of aggregated state that is typically stored in a single place (such as a row in a table), and has relationships to other entities.

Entities can be described using metadata, which can be expressed as annotations (specifically defined types that can be attached to or placed in front of Java programming elements) or in XML (descriptors). An entity manager enables API calls to perform operations on an entity. Until an entity manager is used to create, read, or write an entity, the entity is just a regular nonpersistent object. When an entity manager obtains a reference to an entity, that entity becomes managed by the entity manager. The set of managed entity instances within an entity manager at any given time is called its persistence context. The entity manager can be configured to persist or manage certain types of objects and read or write to a particular data source. Entity managers can be provided by an entity manager factory which can be configured by a persistence unit. Persistence units can be named to allow differentiation between the entity manager factory objects with which they are associated. This way an application obtains control over which configuration to use for operations on a specific entity. Persistence units can be defined in a persistence.xml file.

The EclipseLink environment also includes a persistence manager 118 and an object data conversion module 120, and can be used with a variety of Java architectures. As shown in FIG. 1, a plurality of mappings 122 can be maintained to XML representations 124 stored in memory 126. The persistence manager can communicate with one or more data sources 128 such as a database 130 or Enterprise Information System (EIS) 132. Relational databases can be used for transactional persistence of Java objects using Java Database Connectivity (JDBC) drivers. An EIS can be used for transactional persistence of Java objects to a nonrelational data source accessed using a Java EE Connector architecture (JCA) adapter, and any supported EIS record type, including indexed, mapped, or XML.

Object to XML Mapping

Figure 2:
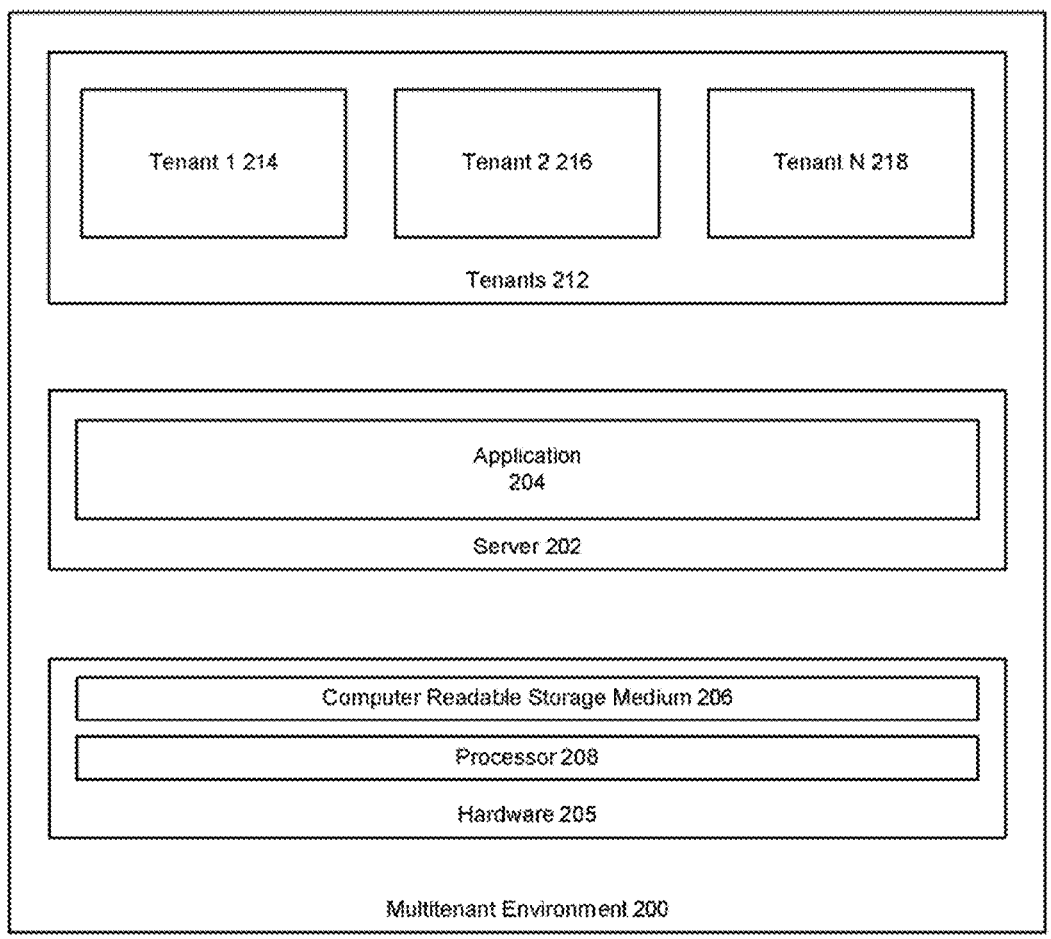
FIG. 2 shows a multitenant environment, in accordance with an embodiment.

FIG. 2 shows a multitenant environment, in accordance with an embodiment. As shown in FIG. 2, the multitenant environment 200 can include a server 202 which hosts and provides access to an application 204. The multitenant environment can further include hardware 205, including a computer readable storage medium 206 and processor 208. In a multi-tenant system, multiple different tenants 212 (i.e., clients) can use the application. For example, as shown in FIG. 2 a plurality of tenants (Tenant 1 214, Tenant 2 216 to Tenant N 218) can each utilize the application executing on the server. The application can include one or more real properties which are available to all of the tenants. However, each tenant can utilize the application differently, and can require more or less information than is made available by default by the application. Accordingly, one or more virtual properties can be used to define additional, tenant-specific properties at runtime. These virtual properties can be defined in one or more metadata files associated with the tenant.

In order to add virtual properties to an entity, a Java class can be marked with an annotation, such as @XmlVirtualAccessMethods, or using an element in OXM, such as <xml-virtual-access-methods>. Additionally, the Java class can contain getter and setter methods to access virtual property values, such as shown below in Listing 1.

Listing 1.

public Object get(String propertyName)
public void set(String propertyName, Object value)

In accordance with an embodiment, the method names for the accessor methods can be user-configurable, while maintaining the method signatures shown above. The system can automatically identify the getter and setter methods based on their default names "set" and "get" or based on information stored about the getter and setter methods if they have been customized.

FIG. 3 shows an example of providing virtual properties using an annotation, in accordance with an embodiment. Listings 300 are shown in FIG. 3 of a domain class 301, the domain class expressed using OXM metadata 312 and additional mappings in a secondary metadata file 316. The domain class 301 can include a flag (i.e. annotation 302) which indicates that it is extensible. A domain class can also include one or more default attributes. For example, the domain class shown in FIG. 3 includes two basic attributes: ID 304 and Name 306.

Annotation 302 indicates that the domain class has accessor methods to handle additional mappings associated with extensions to the application. By default, the system can identify the get method 308 and the set method 310 as the accessors used to extend the application. Extensions can be stored in a virtual property map, and the accessor methods can be used to access (i.e., retrieve or store values) the extended properties stored in the virtual property map.

In accordance with an embodiment, the domain class can also be expressed using OXM metadata 312. The metadata includes the attributes 314 defined in the domain class, in this example, ID and Name. Additional mappings to be added to the domain class can be defined in a primary metadata file or a secondary metadata file 316. As shown in FIG. 3, a new attribute 318 can be added via the secondary metadata file. In accordance with an embodiment, a plurality of new attributes can be added and mapped using one or more secondary metadata files and there is no special configuration needed for these additional mappings; they can be specified in the same way as "normal" mappings. To set the values for these additional mappings, the set( ) method defined in the domain class can be used. Similarly, the get( ) method defined in the domain class can be used to retrieve the values of the additional mappings. Each accessor method can be used to get or set the value of a new attribute by specifying the name of the new attribute and, in the case of the set( ) method, providing a new value for the attribute.

In accordance with an embodiment, the default method names of the accessor methods can be configured by the user with different method names. These custom accessor methods can be specified in an annotation, for example by using the getMethodName and setMethodName attributes on XmlVirtualAccessMethods, i.e., @XmlVirtualAccess Methods (getMethod="getCustomProps", setMethod="putCustomProps"). In OXM, custom method names can be similarly specified in an xml-virtual-access-methods attribute.

In accordance with an embodiment, after one or more virtual properties have been added to a class, if the user generates a schema then the resulting schema can appear differently from any schema that was used to generate the initial domain objects. To configure how the added virtual properties should appear in future generated schemas, a schema attribute on @XmlVirtualAccessMethods can be used. For example, a schema generated for a class before any virtual properties have been added is shown below in Listing 2.

Listing 2.

```
<xs:schema ...>
    <xs:element name="customer">
        <xs:complexType>
            <xs:sequence>
                <xs:element name="first-name" type="xs:string" />
                <xs:element name="last-name" type="xs:string" />
            </xs:sequence>
        </xs:complexType>
    </xs:element>
</xs:schema>
```

In this case, two properties are defined: a first-name and a last-name. If one or more virtual properties are added, for example middle-initial and phone-number, then a subsequently generated schema will appear differently. By default, virtual properties can be shown as individual nodes alongside the properties defined in the class domain, for example as shown in Listing 3.

Listing 3.

```
<xs:schema ...>
    <xs:element name="customer">
        <xs:complexType>
            <xs:sequence>
                <xs:element name="first-name" type="xs:string" />
                <xs:element name="last-name" type="xs:string" />
                <xs:element name="middle-initial" type="xs:string" />
                <xs:element name="phone-number"
                    type="phoneNumber"
maxOccurs="unbounded"/>
            </xs:sequence>
        </xs:complexType>
    </xs:element>
</xs:schema>
```

As shown above, the new virtual properties, middle-initial and phone-number, appear with those properties which are defined in the original class. Alternatively, an XML schema can be generated that allows for any extra content to be present as shown in Listing 4.

Listing 4.

```
<xs:schema ...>
    <xs:element name="customer">
        <xs:complexType>
            <xs:sequence>
                <xs:element name="first-name" type="xs:string" />
                <xs:element name="last-name" type="xs:string" />
                <xsd:any processContents="skip" namespace="##any"
minOccurs="0" maxOccurs="unbounded"/>
            </xs:sequence>
        </xs:complexType>
    </xs:element>
</xs:schema>
```

As shown above, the originally defined properties are still shown, while the newly added virtual properties have been collapsed into an <any> element.

In accordance with an embodiment, a virtual properties map can be marked with an @XmlTransient attribute to prevent the map itself from being bound to XML.

In accordance with an embodiment, when processing an OXM file, if a property is encountered that does not have a corresponding property in Java, then a new property can be created and accessor methods can be setup for mapping values to the new property. However, if the TypeInfo does not have virtual properties enabled, a "No such property exists" exception can be thrown.

Figure 4:
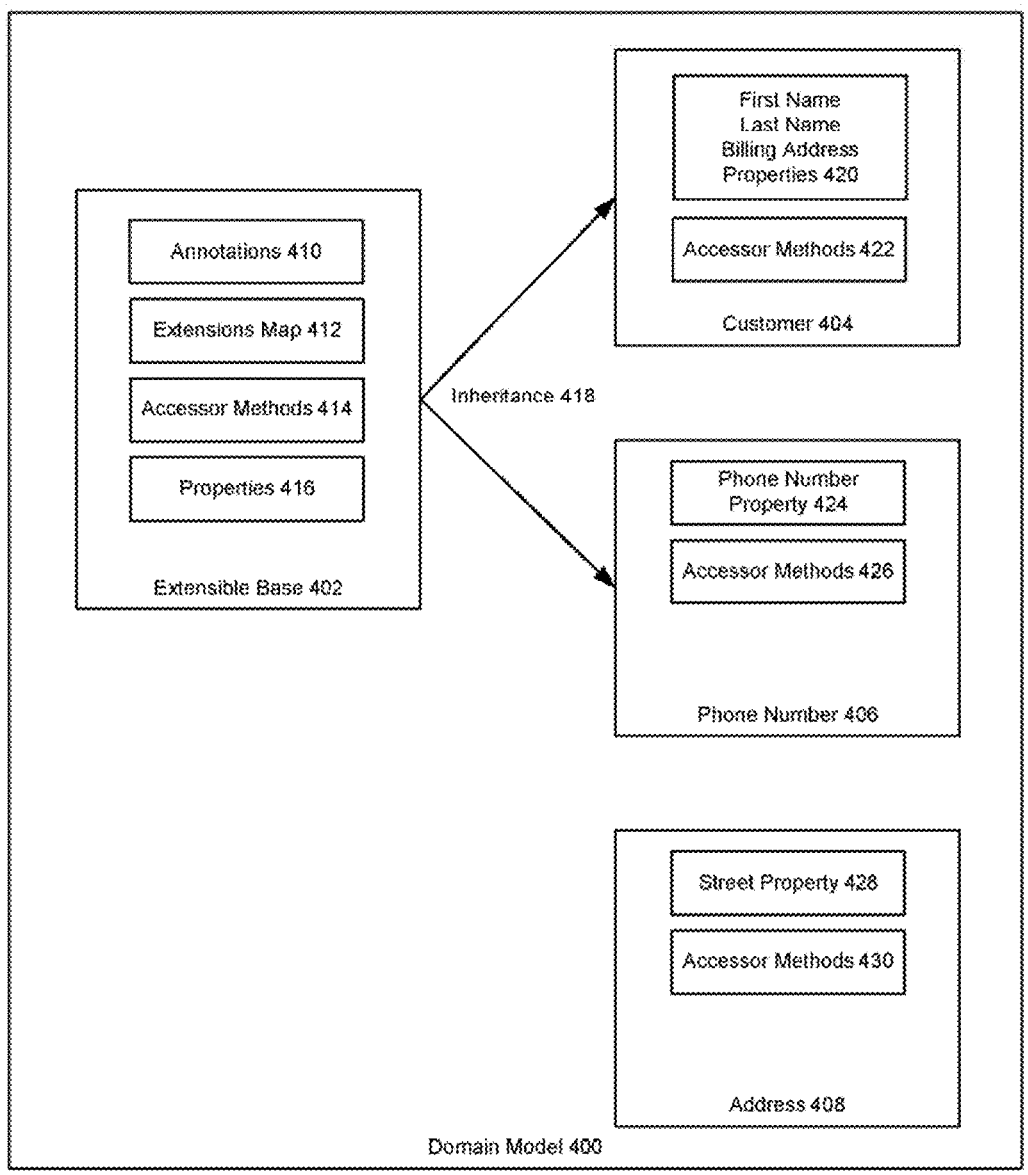
FIG. 4 shows an exemplary domain model, in accordance with an embodiment.

FIG. 4 shows an exemplary domain model, in accordance with an embodiment. As shown in FIG. 4, the domain model 400 includes an Extensible Base class 402 and two child classes Customer 404 and Phone Number 406 which both inherit from the extensible base. The domain model also includes an Address class 408 which does not extend the extensible base class. The extensible base can include one or more annotations 410 including an @XmlVirtualAccess-Methods annotation used to specify that a class is extensible, and an @XmlTransient annotation which can be used to prevent the base class from being mapped as an inheritance relationship. The extensible base class can also include an extensions map 412, which can be used to map extended properties, and accessor methods 414, which can be named by default or can have custom names specified in the extensible base. The extensible base class can further include one or more properties 416 which represent the parts of the model that are common to all tenants. The per-tenant extensions, i.e., newly added properties which are specific to a particular tenant, can be represented as virtual properties. The customer and phone number classes, which both inherit 418 from extensible base, are therefore also extensible.

As shown in FIG. 4, Customer can include a plurality of properties 420 including a first name, last name and billing address property. Customer can also include accessor methods 422 for each of the plurality of properties. These properties will be available to each tenant utilizing the application. However, because Customer is extensible, each tenant can add its own custom properties at runtime by using virtual properties, to tailor the application to their particular needs. Similarly, Phone Number can include a phone number property 424 and accessor methods 426, and can also be extended using virtual properties according to the needs of each tenant. Address is not extensible as it does not inherit from the extensible base. However, it includes a street property 428 and accessor methods 430 which can be used by all tenants.

Figure 5:
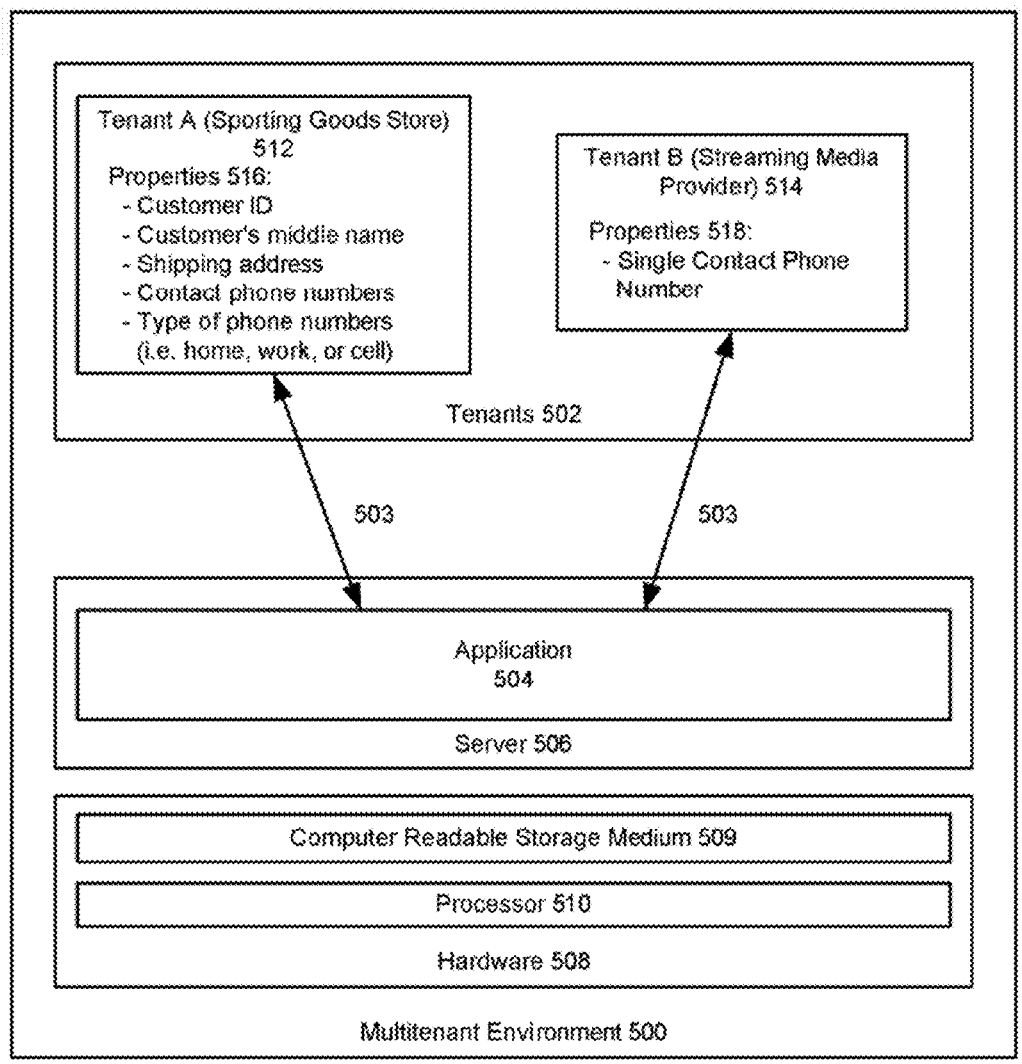
FIG. 5 shows a multitenant system, in accordance with an embodiment.

FIG. 5 shows a multitenant system, in accordance with an embodiment. The example shown in FIG. 5 is for illustration, and is not intended to be restrictive in any way. As shown in FIG. 5, multitenant environment 500 includes two tenants 502 which utilize 503 an application 504 on server 506. The server can be hosted in a computer system including hardware 508, including a computer readable storage medium 509 and processor 510. The Tenant A 512 is an online sporting goods store and Tenant B 514 is a streaming media provider. Each tenant can utilize the default properties of the application. For example, these could be the properties shown in the domain model of FIG. 4. However, given the different nature of each tenant's business, each tenant also needs to extend the application with additional properties tailored to their business. These extensions are tenant-specific and not shared among all of the tenants which use the application. As shown in FIG. 5, the first tenant requires that the domain model be extended with the following properties 516: Customer ID; Customer's middle name; Shipping address; A collection of contact phone numbers; and Type of phone number (i.e. home, work, or cell).

These extensions can be made to different classes within the domain model. For example, the extensions Customer's middle name, Shipping address, and a collection of contact phone numbers can be made to the class "Customer," while the Type of phone number extension can be made to the class "PhoneNumber." The second tenant is a streaming media provider that offers on-demand movies and music to it's subscribers. The second tenant does not require the same extensions as the first tenant, and instead adds one property 518, a single contact phone number.

Figure 6:
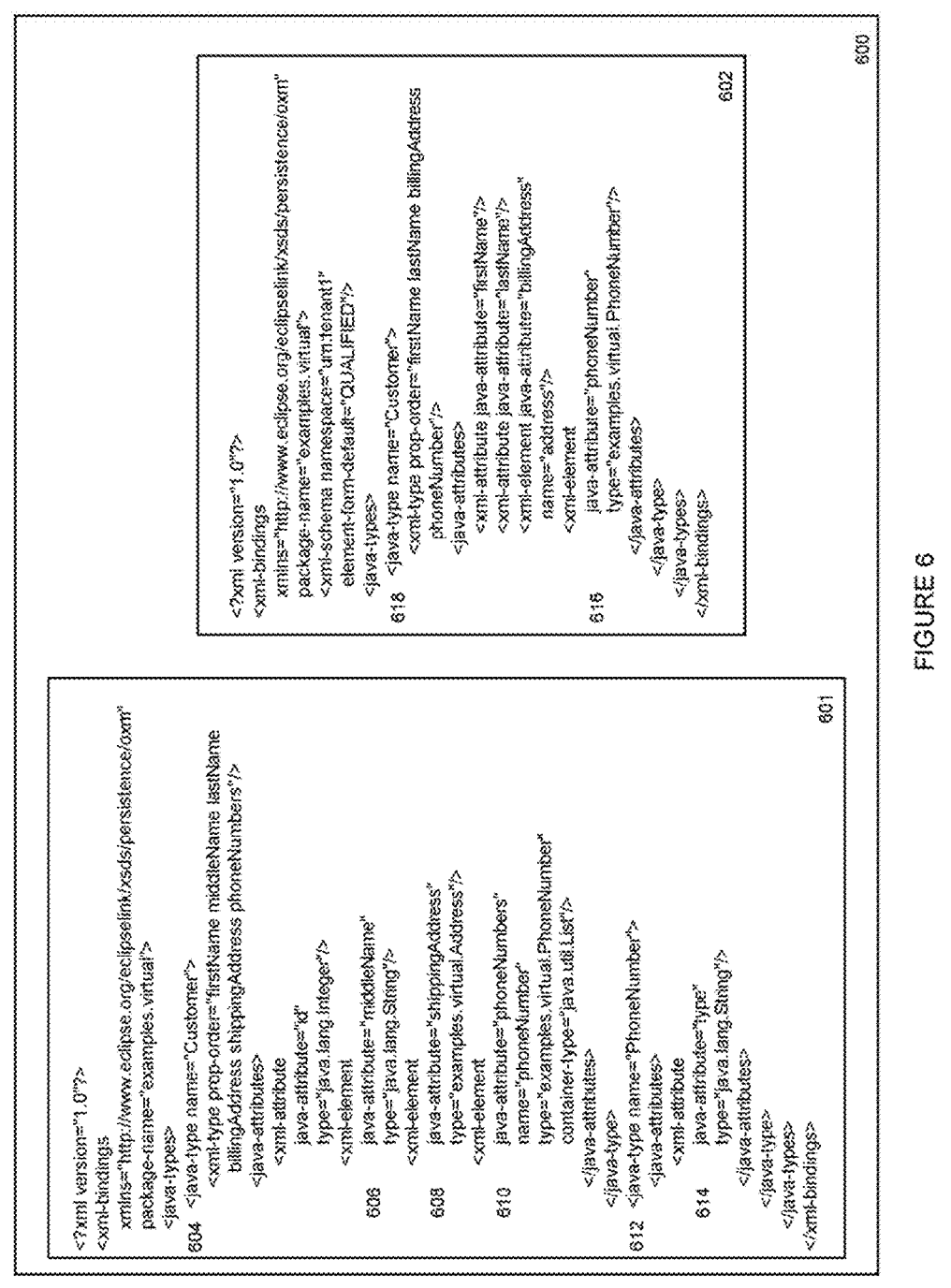

FIG. 6 shows exemplary XML mapping files, in accordance with an embodiment. Listings 600 show XML mapping files for the exemplary tenants of FIG. 5. The metadata for the virtual properties defined for each tenant in FIG. 5, can be supplied using XML mapping files. Listing 601 shows an XML mapping file for Tenant A, while Listing 602 shows an XML mapping file for Tenant B. Virtual properties are mapped in the same way as real properties. Some additional information can be required including type (and other information which may not be determined via reflection), and for collection properties a container type. As described above, the virtual properties defined for Tenant A for the Customer class 604 include "middleName" 606, "shippingAddress" 608 and "phoneNumbers" 610. For the PhoneNumber class 612, the virtual property is the "type" property 614. For Tenant B, a contact phone number 616 has been added to the Customer class 618.

Figure 7:
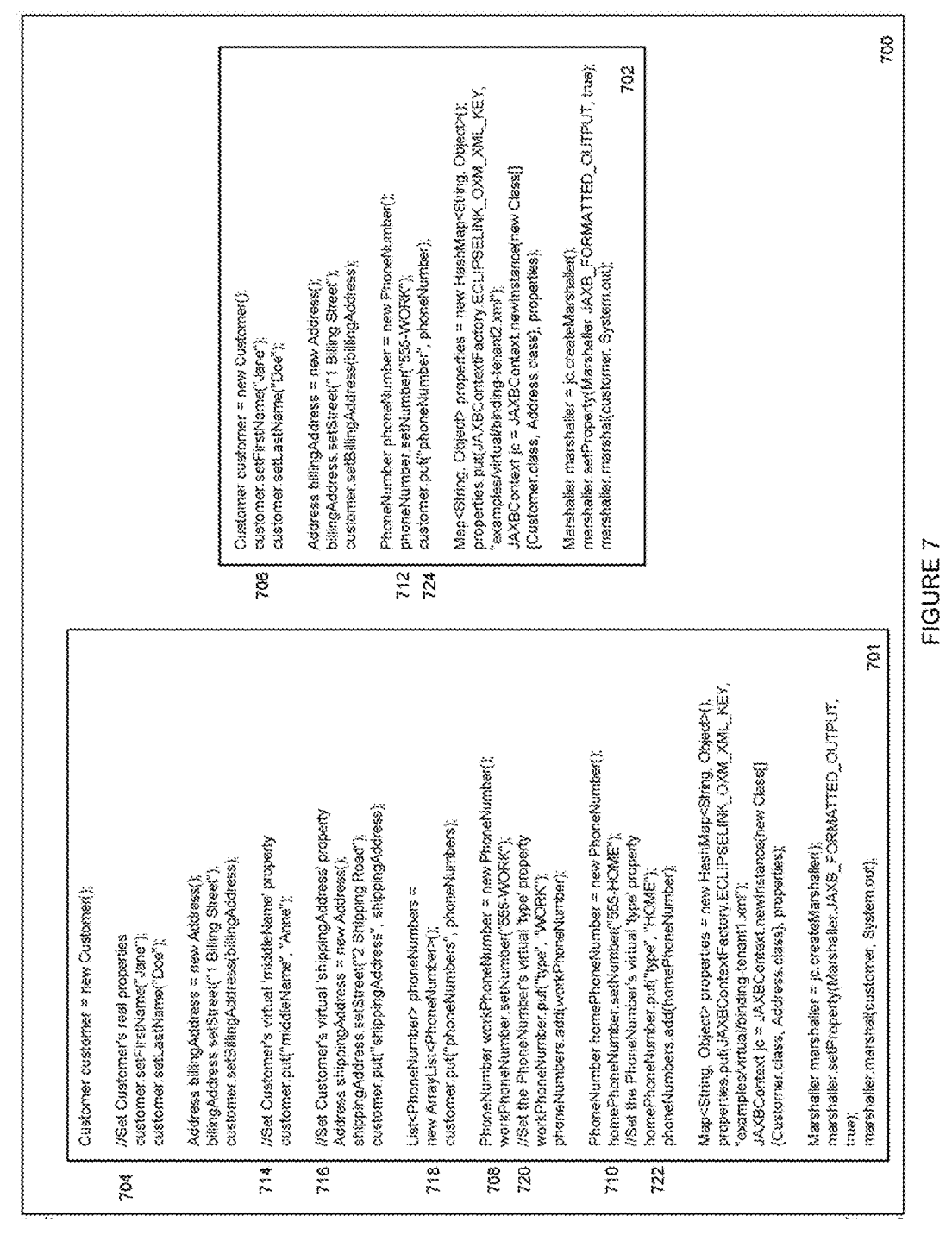

FIG. 7 shows exemplary accessor methods, in accordance with an embodiment. Listings 700 show accessor methods for the exemplary tenants of FIG. 5. Listing 701 shows accessor methods for Tenant A for Customer and PhoneNumber, while listing 702 shows accessor methods for Tenant B for Customer and PhoneNumber. The get/set methods provided by each class in the domain model can be used to interact with the real properties of each class. For example, at 704 and 706, the real properties for Customer are set for Tenant A and Tenant B, respectively. Although only set methods are shown, get methods could be used to retrieve values associated with the real properties. Similarly, the real properties for PhoneNumber are set at 708, 710 and 712 for Tenant A and Tenant B. The accessors defined on the @XmlVirtualAccessMethods annotation can be used to interact with the virtual properties for each of the extensible classes in the domain model. As shown in FIG. 7, the "set" method has been customized, renaming it "put". For example, for Tenant A the extension properties defined for Customer are set at 714-718; and the extension properties for PhoneNumber are set at 720 and 722. Similarly, for Tenant B the extension property is set at 724. Marshal and unmarshal operations can be performed according to JAXB or other typical mechanisms.

FIG. 8 shows exemplary output files, in accordance with an embodiment. Listings 800 show output files for the exemplary tenants of FIG. 5. Listing 801 shows an output file for Tenant A and listing 802 shows an output file for Tenant B, based on the values set in FIG. 7. Although both tenants share several real properties, the corresponding XML representation can be quite different due to virtual properties. In particular, Tenant A includes much more customer information 804 compared to Tenant B 806, and Tenant A also includes different types of phone numbers 808 compared to Tenant B 810.

Figure 9:
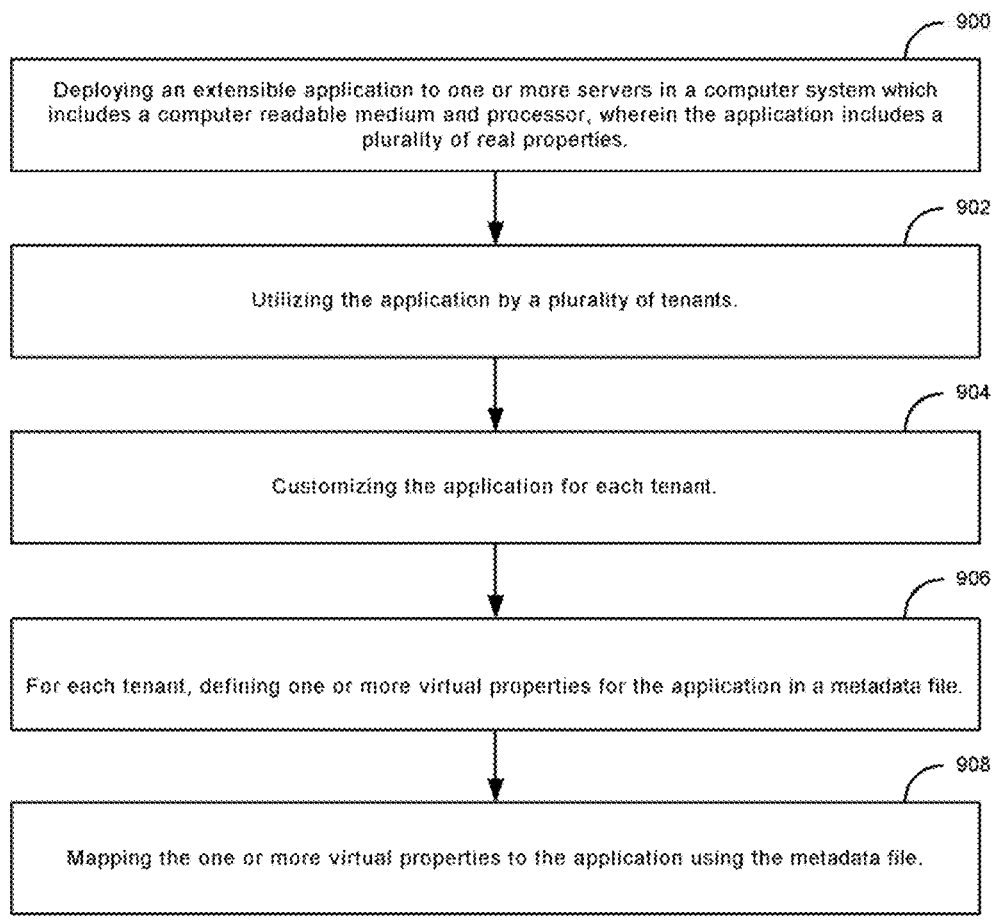
FIG. 9 shows a method for extending an application using virtual properties, in accordance with an embodiment.

FIG. 9 shows a method for extending an application using virtual properties, in accordance with an embodiment. At step 900, an extensible application is deployed to one or more servers in a computer system which includes a computer readable medium and processor, wherein the application includes a plurality of real properties. At step 902, the extensible application is utilized by a plurality of tenants. At step 904, the application is customized for each tenant. At step 906, the customization can include, for each tenant, defining one or more virtual properties for the application in a metadata file. At step 908, the customization can further include mapping the one or more virtual properties to the application using the metadata file.

In accordance with an embodiment, the method shown in FIG. 9 can further include that the extensible application is associated with a domain model which includes one or more classes. Additionally, at least one class in the domain model is indicated as being extensible using an annotation. In accordance with an embodiment, the extensible application is customized at runtime. The extensible application includes accessor methods used to store or retrieve values for each of the one or more virtual properties and the accessor methods can be customized while maintaining the same method signature.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for extending applications, comprising:
a computer, including a microprocessor;
one or more servers executing on the computer;
an application deployed to the one or more servers for use by a first tenant and a second tenant different than the first tenant, wherein the application includes:
a class defined in a source code of the application, wherein the class defines an object, comprises a body, and is stored in a class file before compilation;
a first mapping file associated with the first tenant and a second mapping file associated with the second tenant, wherein the first mapping file and the second mapping file are separate files from the class file, wherein at least one of the first mapping file and the second mapping file is a markup language file, wherein a first extension property is defined in the first mapping file and a second extension property is defined in the second mapping file, and wherein the first extension property and the second extension property are absent from the body of the class;
an first annotation to the class indicating that the first extension property and the second extension property are each properties of the class;
accessor methods for accessing the one or more extension properties in the mapping file; and
a second annotation to the class indicating that the accessor methods handle additional mappings associated with the first extension property and the second extension property, and
wherein at runtime the first extension property is added to a first instance of the object instantiated by the first tenant and the second extension property is added to a second instance of the object instantiated by the second tenant.

2. The system of claim 1, wherein the accessor methods are used to store or retrieve values for each of the first extension property and the second extension property to or from the first mapping file and the second mapping file respectively.

3. The system of claim 1, wherein the name of each accessor method is customizable.

4. A method for extending applications, comprising:
providing an application deployed to one or more servers for use by a first tenant and a second tenant different than the first tenant, wherein the application includes:
a class defined in a source code of the application, wherein the class defines an object, comprises a body, and is stored in a class file before compilation;
a first mapping file associated with the first tenant and a second mapping file associated with the second tenant, wherein the first mapping file and the second mapping file are separate files from the class file, wherein at least one of the first mapping file and the second mapping file is a markup language file, wherein a first extension property is defined in the first mapping file and a second extension property is defined in the second mapping file, and wherein the first extension property and the second extension property are absent from the body of the class;
a first annotation to the class indicating that the first extension property and the second extension property are each properties of the class;
accessor methods for accessing the one or more extension properties in the mapping file; and
a second annotation to the class indicating that the accessor methods handle additional mappings associated with the first extension property and the second extension property, and
adding the first extension property to a first instance of the object instantiated by the first tenant and the second extension property to a second instance of the object instantiated by the second tenant at runtime.

5. The method of claim 4, wherein the accessor methods are used to store or retrieve values for each of the first extension property and the second extension property to or from the first mapping file and the second mapping file respectively.

6. The method of claim 5, wherein the name of each accessor method is customizable.

7. A non-transitory computer readable storage medium, including instructions stored thereon which, when executed by a computer, cause the computer to perform the steps comprising:
providing an application deployed to the one or more servers for use by for use by a first tenant and a second tenant different than the first tenant, wherein the application includes
a class defined in a source code of the application, wherein the class defines an object, comprises a body, and is stored in a class file before compilation;
a first mapping file associated with the first tenant and a second mapping file associated with the second tenant, wherein the first mapping file and the second mapping file are separate files from the class file, wherein at least one of the first mapping file and the second mapping file is a markup language file, wherein a first extension property is defined in the first mapping file and a second extension property is defined in the second mapping file, and wherein the first extension property and the second extension property are absent from the body of the class;
a first annotation to the class indicating that the first extension property and the second extension property are each properties of the class;
accessor methods for accessing the one or more extension properties in the mapping file; and
a second annotation to the class indicating that the accessor methods handle additional mappings associated with the first extension property and the second extension property, and
adding the first extension property to a first instance of the object instantiated by the first tenant and the second extension property to a second instance of the object instantiated by the second tenant at runtime.

8. The non-transitory computer readable storage medium of claim 7, wherein the accessor methods are used to store or retrieve values for each of the first extension property and the second extension property to or from the first mapping file and the second mapping file respectively.

9. The non-transitory computer readable storage medium of claim 7, wherein the name of each accessor method is customizable.

10. The system of claim 1, wherein each of an output file of the class, and the first mapping file and the second mapping file is an extensible markup language (XML) file.

11. The system of claim 1, wherein an output file of the class is generated using an extensible markup language (XML) binder.

12. The method of claim 4, wherein the class is a Java class.

13. The method of claim 4, wherein each of an output file of the class, and the first mapping file and the second mapping file is an extensible markup language (XML) file.

14. The method of claim 4, wherein an output file of the class is generated using an extensible markup language (XML) binder.

15. The non-transitory computer readable storage medium of claim 7, wherein the class is a Java class.

16. The non-transitory computer readable storage medium of claim 7, wherein each of an output file of the class, and the first mapping file and the second mapping file is an extensible markup language (XML) file.

* * * * *